United States Patent [19]
Chaloult et al.

[11] Patent Number: 6,073,984
[45] Date of Patent: Jun. 13, 2000

[54] ADJUSTABLE STORAGE COMPARTMENT

[75] Inventors: Brian Chaloult, Rochester Hills; George Walczowski, New Baltimore, both of Mich.

[73] Assignee: DaimlerChrysler Corporation, Auburn Hills, Mich.

[21] Appl. No.: 09/219,052

[22] Filed: Dec. 23, 1998

[51] Int. Cl.⁷ .................................................... B60N 3/12
[52] U.S. Cl. ...................... 296/37.13; 296/37.8; 296/37.5
[58] Field of Search ................... 296/191, 37.5, 296/37.8, 37.13, 37.14, 37.6, 37.2, 37.3, 37.1

[56] References Cited

U.S. PATENT DOCUMENTS

| | | |
|---|---|---|
| 3,727,971 | 4/1973 | Sisler . |
| 4,660,880 | 4/1987 | Bensch . |
| 5,823,598 | 10/1998 | Clare et al. . |
| 5,951,085 | 9/1999 | Fukatsu ................................. 296/37.8 |

FOREIGN PATENT DOCUMENTS

| | | |
|---|---|---|
| 862442 | 12/1939 | France . |
| 1202780 | 9/1958 | France . |
| 57-198138 | 12/1982 | Japan ..................................... 296/37.8 |

*Primary Examiner*—D. Glenn Dayoan
*Assistant Examiner*—Jason Morrow
*Attorney, Agent, or Firm*—Marc Lorelli

[57] ABSTRACT

An adjustable storage compartment for use in a motor vehicle is provided. The storage compartment includes a trim panel with a cavity formed therein. The cavity is comprised of a central region from which a first portion extends horizontally therefrom and a second portion extends vertically therefrom. A partitioning panel is also provided that can be disposed to separate the first portion and the central region from the second portion. The partitioning panel can also be pivoted such that the panel separates the first portion from the central region and the second portion. The partitioning panel can also be removed to provide a storage area that encompasses the central region along with both the first and second portions.

15 Claims, 2 Drawing Sheets

ADJUSTABLE STORAGE COMPARTMENT

BACKGROUND OF THE INVENTION

1. Technical Field

The present invention generally relates to storage compartments for automotive vehicles. More specifically, the present invention relates to an operator adjustable storage compartment for an automotive vehicle.

2. Discussion

Various types of storage compartments for motor vehicles are known in the art. Such compartments are provided in vehicles to store a vast array of items. There has been an industry wide push to provide storage compartments that do not effectively protrude into the passenger compartment. This is in an effort to provide the largest interior volume possible.

An example of such a compartment is disclosed in U.S. Pat. No. 4,660,880, which provides a storage bin that straddles the front wheel well of a motor vehicle. In '880, the storage compartment is located in the engine area. The storage bin is disposed about the wheel well to provide utility to a relatively difficult arrangement of space. The bin includes a hinged top and a divider wall. The divider wall is intended to provide an operator with the option of storing an item in either the forward or rearward portion of the bin. The storage bin itself, however, is unreachable while the vehicle is moving. However, this arrangement would require an operator to stop his or her vehicle in order to get to an item in the storage bin.

Another example of a storage bin is provided in French Patent No. 1,202,780. This patent describes a storage bin that protrudes into the passenger compartment from the quarter panel of a vehicle. The bin has a hinged top, similar to that in '880. In addition, the bin has a second hinged component that can be operated to access another storage area underneath. This provides the operator with the option to store an item in the top or the lower areas of the bin, but not in both.

There is, therefore, a need to improve the functionality of storage compartments used in motor vehicles. There is also a need to provide organization for a storage compartment such that large and small items may be stowed. There is a further need to provide a concealed compartment when desired by the operator of the vehicle to prohibit visibility of a particular item.

SUMMARY OF THE INVENTION

Accordingly, it is a principal objective of the present invention to provide an adjustable storage compartment.

It is another objective of the present invention to provide a storage compartment with a removable partitioning panel.

It is yet another objective of the present invention to provide a storage compartment with a central region with a first portion extending horizontally therefrom and a second portion extending vertically therefrom. A removable partitioning panel is provided that can be disposed either to separate the first portion and central region from the second portion in a first position or to separate the first portion from the central region and the second portion in a second position.

In one form, an adjustable storage compartment for use in a motor vehicle is provided. The storage compartment includes a trim panel with a cavity formed therein. The cavity is comprised of a central region from which a first portion extends horizontally therefrom and a second portion extends vertically therefrom. A partitioning panel is also provided that can be disposed to separate the first portion and the central region from the second portion. The partitioning panel can also be pivoted such that the panel separates the first portion from the central region and the second portion. Additionally, the partitioning panel can be removed to provide a storage area that encompasses the central region along with both the first and second portions.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
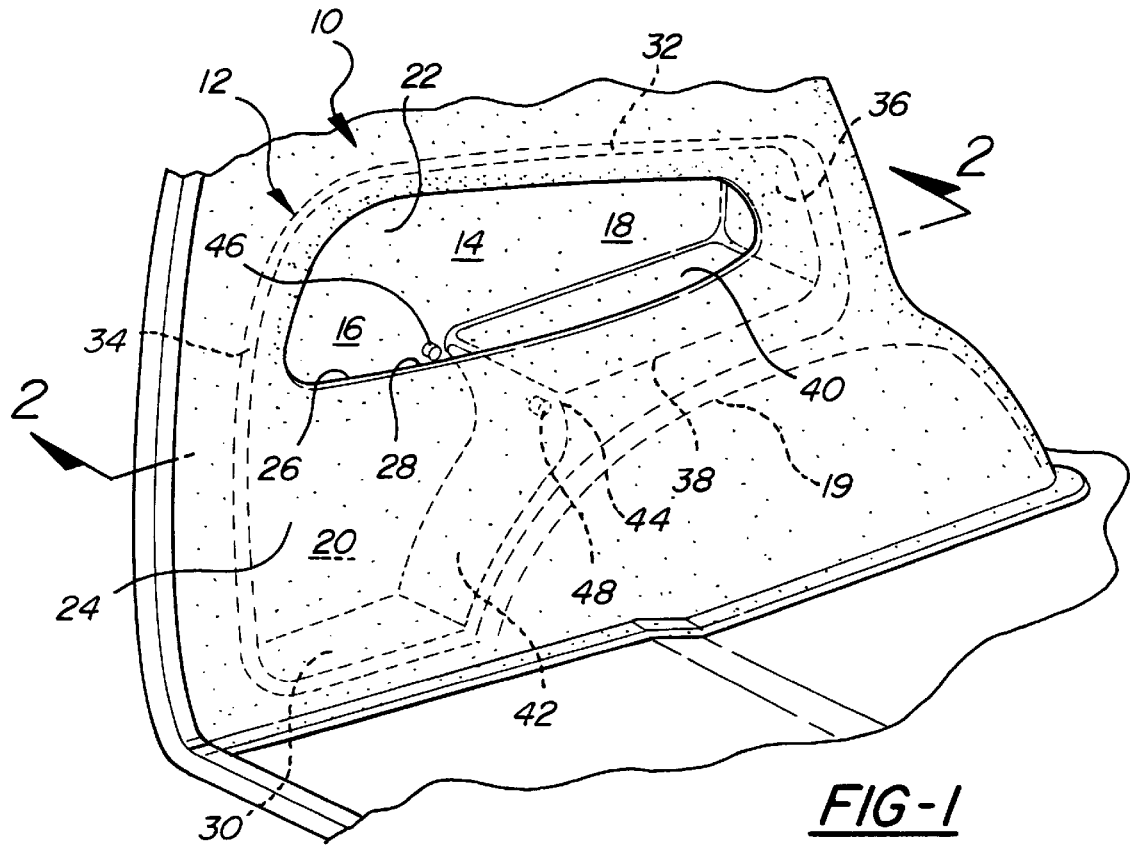
FIG. 1 is a perspective view of a rear quarter trim panel of a motor vehicle illustrated an adjustable storage compartment built therein.

Referring now to the drawings, FIG. 1 illustrates an adjustable storage bin 10. A trim panel 12 is provided with a cavity 14 formed therein. Cavity 14 is generally L-shaped and includes a central region 16, a horizontal portion 18, and a vertical portion 20. Horizontal region 18 is disposed substantially above a wheelhouse 19 and vertical portion 20 is disposed rearward of the wheelhouse 19. Central region 16 and portions 18 and 20 can be best seen in FIG. 2. All portions 16,18, and 20 of cavity 14 are bounded in the outboard direction by a back wall 22. Cavity 14 is bounded in the inboard direction by a front wall 24. Front wall 24 has an opening 26 formed therein adjacent to central region 16 and horizontal portion 18. The lower edge of opening 26 is defined a substantially horizontal lip 28. Cavity 14 is bounded by a bottom wall 30, a top wall 32, a rearward wall 34, a forward wall 36, and a wheel well wall 38. Wheel well wall 38 having a horizontally angled component 40 and a vertically angled component 42 separated by a transitioning corner 44. Horizontal lip 28 is disposed slightly above horizontally angled component 40 of wheel well wall 38. One can appreciate that central region 16 and horizontal portion 18 can be directly accessed through opening 26, and that vertical portion 20 can only be accessed via central region 16; this is attributable to front wall 24 blocking direct access thereto. Back wall 22 includes a cylindrical pin 46 extending therefrom and front wall 24 includes another cylindrical pin 48 extending therefrom. Pins 46 and 48 define an axis therebetween about which a removable partitioning panel 50 may rotate, not shown in FIG. 1.

Figure 2:
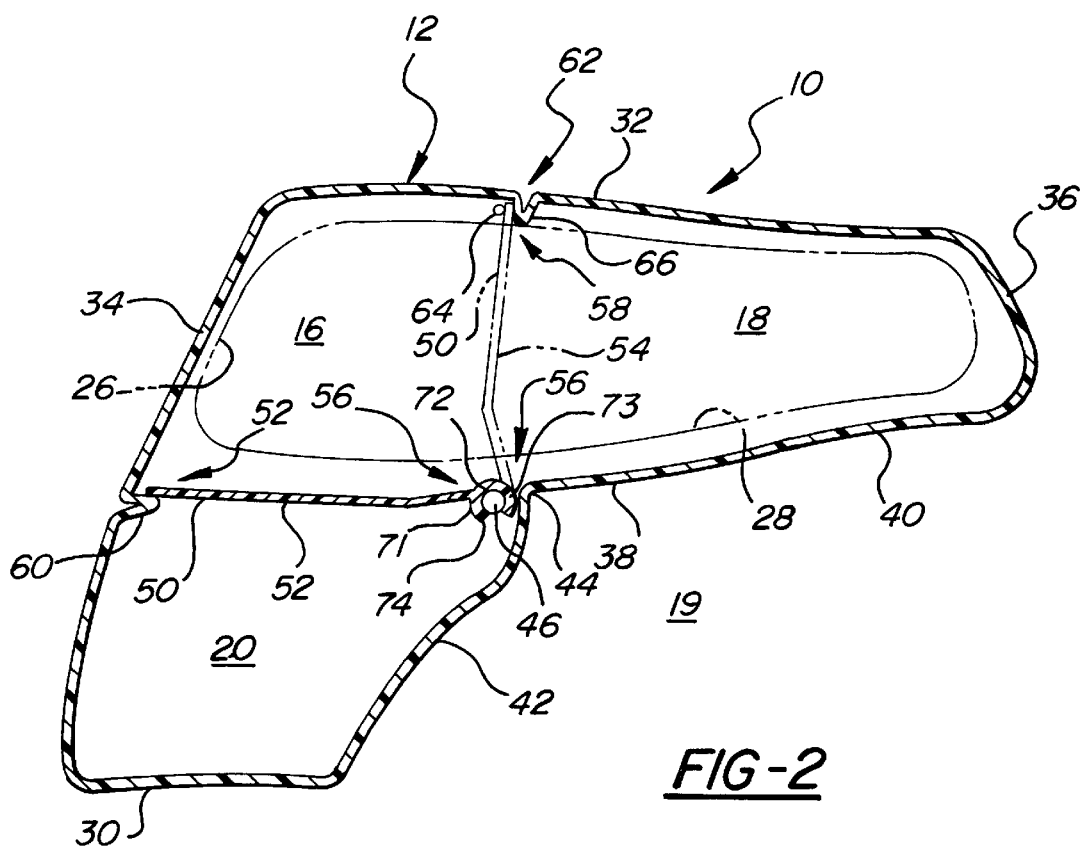
FIG. 2 is a cross sectional view along the line 2-2 of FIG. 1 including a partitioning panel shown in a first position and shown in phantom in a second position.

Turning to FIG. 2, removable partitioning panel 50 is illustrated in a horizontal position 52 and in phantom in a vertical position 54. Panel 50 is hinged at a first end 56 to as to rotate between horizontal position 52 and vertical position 54. Panel 50 also includes a second end 58, opposite said first end 56, that contacts a stop wedge 60 disposed on rearward wall 34 while panel 50 is in horizontal position 52. The stop wedge 60 is utilized to support panel 50 in horizontal position 52. Stop wedge 60 limits rotation of panel 50 such that panel 50 forms a horizontal surface. A holding system 62 comprised of a detent 64 and a projection 66 is utilized to hold second end 58 of panel 50 while the panel 50 is in vertical position 54. As panel 50 is rotated from the horizontal position 52 to the vertical position 54, the second end 58 comes in contact with detent 64. A slight amount of force is necessary to overcome the detent 64 with the second end 58 of panel 50. Once the second end 58 overcomes detent 64 it becomes trapped between projection 66 and detent 64, held by essentially the force needed to overcome the detent 64. One can appreciate that a force similar to the force needed to overcome detent 64 while rotating panel 50 into the vertical position 54 is needed to overcome detent 64 so that panel 50 can rotate from the vertical position 54 to the horizontal position 52. There may be many different types of detents that may be utilized, in the exemplary embodiment detent 64 consists of plastic that has a slight amount of outboard give actionable when a predetermined force from panel 50 is obtained.

Figure 3:
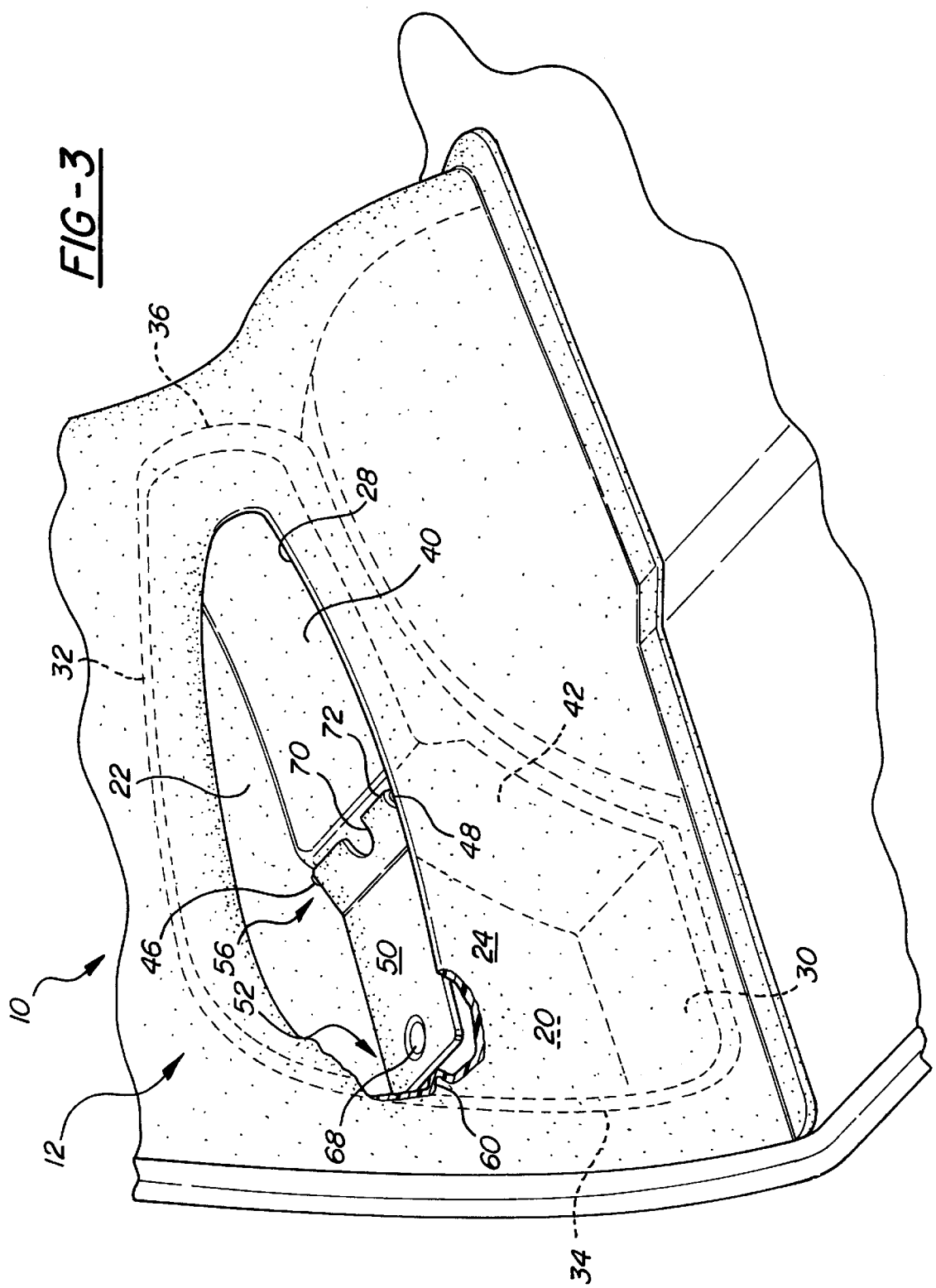
FIG. 3 is an elevated perspective view of a rear quarter trim panel with the partitioning panel in a first position.

Turning to FIG. 3, panel 50 includes a finger hole 68 proximately located to second end 58 so as to allow a location for the operator to grip while transitioning between horizontal position 52 and vertical position 54. Panel 50 also includes hemispherical notch 70 proximately located to first end 56 so as to allow a location for the operator to grip while removing and installing panel 50 from trim panel 12. With continued reference to FIGS. 2 and 3, panel 50 includes a pair of circular fingers 72 that are cooperative with cylindrical pins 46 and 48. Each circular finger includes a body prong 71 and an end prong 73 formed in a crescent shaped manner. Prongs 71 and 73 form circular structure having an opening 74, the diameter of which is slightly larger than the diameter of the corresponding cylindrical pin 46. Opening 74 of circular finger 72 is smaller than the diameter of the corresponding cylindrical pin 46. To install panel 50 into cavity 14 of trim panel 12, opening 74 is placed on cylindrical pin 46 and panel 50 is forced downward so that cylindrical pin 46 is received within the substantially circular structure of the crescent shaped circular finger 72. As the first end 56 of panel 50 is forced downward the prongs 71 and 73 bend outward to as to allow reception of cylindrical pin 46 into circular finger 72. As the reception nears completion, prongs 71 and 73 resile to join the panel 50 and the trim panel 12 in a hinged relationship. One can appreciate that panel 50 can be removed in essentially the opposite manner.

The detachable joining of panel 50 and trim panel 12 within cavity 14 creates an adjustable storage bin 10. One may appreciate that panel 50, while placed in vertical position 54, creates a large vertically oriented storage area comprised of central region 16 and vertical portion 20, and a separate smaller storage area comprising horizontal portion 18, both of the storage area being accessible through opening 26. One may also appreciate that panel 50, while placed in horizontal position 52, creates a large horizontally oriented storage area comprised of central region 16 and horizontal portion 18, which may be accessed through opening 26. A separate smaller storage area comprising vertical portion 20 is also formed that cannot be accessed through opening 26. It can also be appreciated that panel 50 can be removed so as to form a large I-shaped storage area defined by cavity 14.

While the above description constitutes the preferred embodiment of the invention, it will be appreciated that the invention is susceptible to modification, variation, and change without departing from the proper scope or fair meaning of the accompanying claims.

What is claimed is:

1. An adjustable storage compartment for use in an automotive vehicle, said compartment comprising:
   a trim panel having a cavity formed therein; said cavity having an central region from which a first portion of said cavity extends in a substantially horizontal direction and a second portion of said cavity that extends in a substantially vertical direction from said central region; and
   a partitioning panel that can be disposed to separate said first portion and said central region from said second portion or to separate said second portion and said central region from said first portion.

2. The adjustable storage compartment as set forth in claim 1, wherein said partitioning panel is removable.

3. The adjustable storage compartment as set forth in claim 1, wherein said partitioning panel includes a hinge at one end so as to pivot from a first position separating said first portion and said central region from said second portion to a second position separating said second portion and said central region from said first portion.

4. The adjustable storage compartment as set forth in claim 3, wherein said second portion is only accessible through said central region, whereby positioning said partitioning panel at said first position separating said first portion and said central region from said second portion limits accessibility unless said partitioning panel is moved.

5. The adjustable storage compartment as set forth in claim 3, further comprising a stop wedge attached to said trim panel to support said partitioning panel in said second position on an end opposite said hinge.

6. The adjustable storage compartment as set forth in claim 3, further comprising a holding system comprising a detent and a projection from said trim panel to trap said partitioning panel therebetween when said partitioning panel is in said first position.

7. The adjustable storage compartment as set forth in claim 3, wherein said partitioning panel includes a circular finger, and said trim panel includes a cylindrical pin, said circular finger and said cylindrical pin cooperate for joining said partitioning panel to said trim panel in a hinged manner, said circular finger capable of bending slightly outward and resiling for installing and removing said partitioning panel from said trim panel.

8. The adjustable storage compartment as set forth in claim 3, wherein said partitioning panel includes two handles, one near the hinge for aiding in removing and installing said partitioning panel and a second near the opposite end of said partitioning panel for aiding in pivoting said partitioning panel.

9. An adjustable storage compartment for use in an automotive vehicle, said compartment comprising:
   a trim panel having a cavity formed therein; said cavity having an central region from which a first portion of said cavity extends in a substantially horizontal direction and a second portion of said cavity extends in a substantially vertical direction; said first portion defined vertically by a wall; said trim panel having a front wall, said front wall having an opening defined by a substantially horizontal lip, said lip disposed vertically above said wall of said first portion of said cavity.

10. An adjustable storage compartment for use in an automotive vehicle, said compartment comprising:
    a trim panel having a cavity formed therein; said cavity having an central region from which a first portion of said cavity extends in a substantially horizontal direction and a second portion of said cavity extends in a substantially vertical direction from said central region, said first portion is disposed substantially above a wheelhouse of the vehicle and the second portion is disposed laterally from said wheelhouse; and a removable partitioning panel that includes a hinge at one end so as to pivot from a first position separating said first portion and said central region from said second portion to a second position separating said second portion and said central region from said first portion, said first portion defined vertically by a horizontally angled wall; said trim panel having a front wall, said front wall having the uppermost portion defined by a substantially horizontal lip, said lip disposed vertically above said horizontally angled wall of said first portion of said cavity, whereby positioning said partitioning panel at said first position separating said first portion and said central region from said second portion eliminates accessibility unless said partitioning panel is moved.

11. The adjustable storage compartment as set forth in claim 10, further comprising a stop wedge attached to said trim panel to support said partitioning panel in said second position on an end opposite said hinge.

12. The adjustable storage compartment as set forth in claim 11, further comprising a holding system comprising a detent and a projection from said trim panel to entrap said partitioning panel therebetween when said partitioning panel is in said first position.

13. The adjustable storage compartment as set forth in claim 12, wherein said partitioning panel includes a circular finger, and said trim panel includes a cylindrical pin, said circular finger and said cylindrical pin cooperate for joining said partitioning panel to said trim panel in a hinged manner, said circular finger capable of bending slightly outward and resiling for installing and removing said partitioning panel from said trim panel.

14. The adjustable storage compartment as set forth in claim 13, wherein said partitioning panel includes two handles, one near the hinge for aiding in removing and installing said partitioning panel and a second near the opposite end of said partitioning panel for aiding in pivoting said partitioning panel.

15. An adjustable storage compartment for use in an automotive vehicle having a wheelhouse, said compartment comprising:

a trim panel having a cavity formed therein; said cavity having an central region from which a first portion of said cavity extends in a substantially horizontal direction and a second portion of said cavity that extends in a substantially vertical direction from said central region; and a partitioning panel that can be disposed to separate said first portion and said central region from said second portion or to separate said second portion and said central region from said first portion;

wherein said first portion is disposed substantially above the wheelhouse of a vehicle and the second portion is disposed laterally from said wheelhouse.

* * * * *

UNITED STATES PATENT AND TRADEMARK OFFICE
Certificate

Patent No. 6,073,984

Patented: June 13, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Brian Chaloult, Rochester Hills, MI; George Walczowski, New Baltimore, MI; and Brian Muirhead, Shelby.

Signed and Sealed this Nineteenth Day of August 2003.

D. GLENN DAYOAN
*Supervisory Patent Examiner*
Art Unit 3612

UNITED STATES PATENT AND TRADEMARK OFFICE
Certificate

Patent No. 6,073,984                                                  Patented: June 13, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Brian Chaloult, Rochester Hills, MI; George Walczowski, New Baltimore, MI; and Brian Muirhead, Shelby Township, MI Signed and Sealed this Ninth Day of December 2003.

<div style="text-align:right">
D. GLENN DAYOAN<br>
<i>Supervisory Patent Examiner</i><br>
Art Unit 3612
</div>